(12) United States Patent
Park et al.

(10) Patent No.: US 9,686,042 B2
(45) Date of Patent: Jun. 20, 2017

(54) METHOD AND APPARATUS OF TRANSMITTING PILOT SIGNAL FOR FREQUENCY SHARED BROADCASTING

(71) Applicant: Electronics and Telecommunications Research Institute, Daejeon (KR)

(72) Inventors: Sung Ik Park, Daejeon (KR); Sun Hyoung Kwon, Daejeon (KR); Heung Mook Kim, Daejeon (KR); Nam Ho Hur, Daejeon (KR); Jeong Chang Kim, Busan (KR); Jae Hyun Seo, Daejeon (KR); Ho Min Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 188 days.

(21) Appl. No.: 14/251,300

(22) Filed: Apr. 11, 2014

(65) Prior Publication Data

US 2015/0163013 A1    Jun. 11, 2015

(30) Foreign Application Priority Data

Dec. 5, 2013  (KR) .................. 10-2013-0150462

(51) Int. Cl.
| | |
|---|---|
| H04L 1/00 | (2006.01) |
| H04L 27/26 | (2006.01) |
| H04L 5/00 | (2006.01) |
| H04W 16/14 | (2009.01) |
| H04N 21/61 | (2011.01) |
| H04N 21/438 | (2011.01) |

(52) U.S. Cl.
CPC .......... *H04L 1/0042* (2013.01); *H04L 1/0075* (2013.01); *H04L 5/0048* (2013.01); *H04L 27/2613* (2013.01); *H04L 27/2692* (2013.01); *H04W 16/14* (2013.01); *H04N 21/4382* (2013.01); *H04N 21/6112* (2013.01)

(58) Field of Classification Search
None
See application file for complete search history.

(56) References Cited

U.S. PATENT DOCUMENTS

| | | | |
|---|---|---|---|
| 2005/0147024 A1* | 7/2005 | Jung | H04B 1/713 370/203 |
| 2009/0279471 A1 | 11/2009 | Vijayan et al. | |
| 2011/0201365 A1* | 8/2011 | Segura | H04W 4/005 455/466 |
| 2013/0242768 A1* | 9/2013 | Li | H04B 7/0671 370/252 |

FOREIGN PATENT DOCUMENTS

KR    1020080103546 A    11/2008

* cited by examiner

*Primary Examiner* — Chi H Pham
*Assistant Examiner* — Raul Rivas
(74) *Attorney, Agent, or Firm* — William Park & Associates Ltd.

(57) ABSTRACT

Disclosed is a method of transmitting, by a transmission device, broadcast signals in a frequency-shared terrestrial broadcast system. The method includes generating the broadcast signals including pilot signals arranged at a physical layer frame based on a group identification (ID) defined according to a broadcast service, and transmitting the generated broadcast signals to a reception device, wherein the positions of the pilot signals arranged at the physical layer frame are different by group IDs.

6 Claims, 5 Drawing Sheets

FIG. 3
Group A (300)
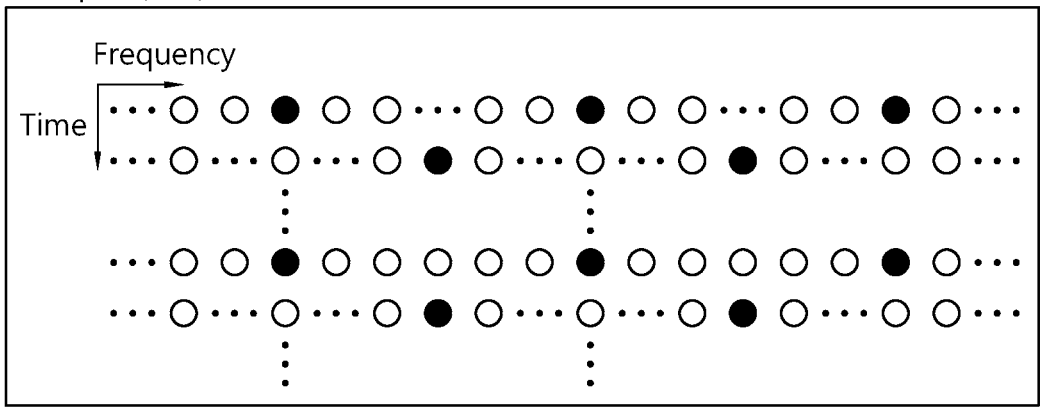
Group B (310)
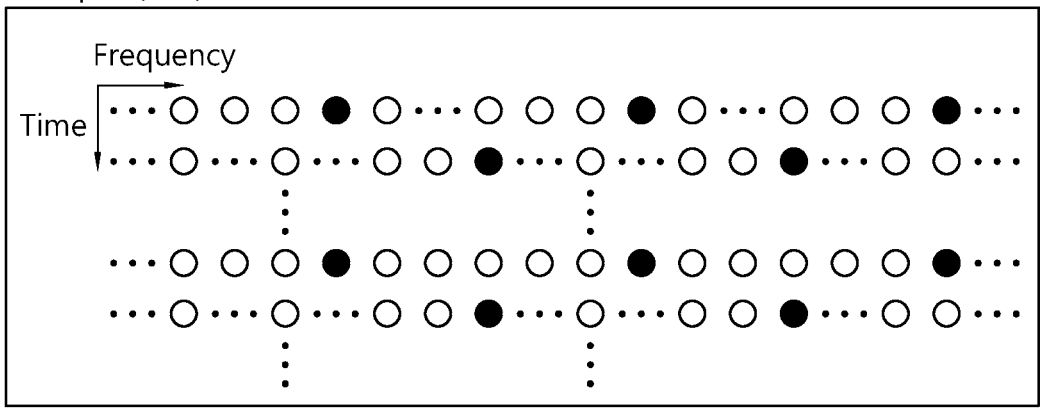
Group C (320)
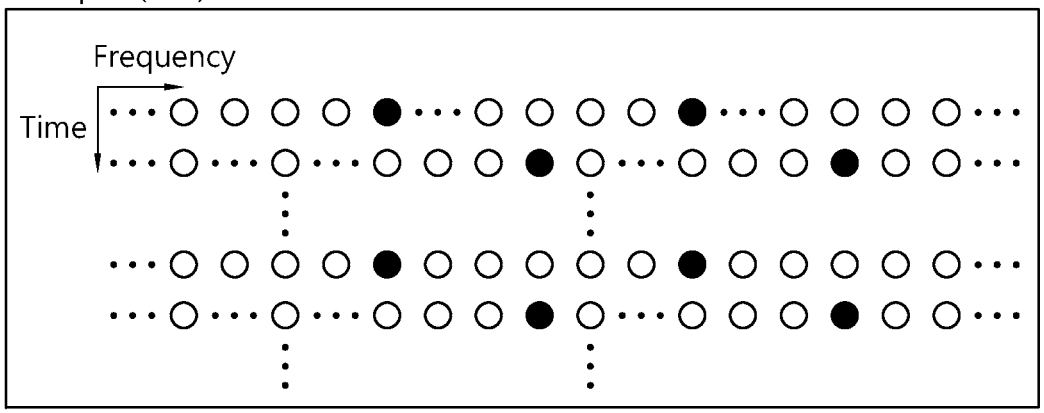
● Pilot
○ Data

METHOD AND APPARATUS OF TRANSMITTING PILOT SIGNAL FOR FREQUENCY SHARED BROADCASTING Priority to Korean patent application number 10-2013-0150462 filed on Dec. 5, 2013, the entire disclosure of which is incorporated by reference herein, is claimed.

BACKGROUND OF THE INVENTION

Field of the Invention

The present invention relates to a wireless broadcast communication, and more particularly, to a method and apparatus for transmitting a pilot signal for a frequency-shared terrestrial broadcast system which operates in a single frequency network.

Discussion of the Related Art

The current terrestrial TV broadcasting generates a co-channel interference in a region covering about three times of the service radius, and thus it is not possible to use the same frequency in the region within the three times of the service radius. Likewise, the region where the same frequency cannot be used may be called a white space (WS), and the spectrum efficiency is very low due to the white space. Recently, as a way of improving the spectrum efficiency, transmission technologies for removing the white space and allowing an easy reuse of the frequency which enhances the transmission capacity and receiving strength are being developed.

As such, the literature "Cloud Transmission: A New Spectrum-Reuse Friendly Digital Terrestrial Broadcasting Transmission System", which has been published through IEEE Transactions on Broadcasting, vol. 58, no. 3 in September, 2012, suggested a frequency-shared terrestrial broadcast technology which allows an easy reuse, does not generate a white space, and allows an easy establishment and operation of a single frequency network.

By using such a frequency-shared terrestrial broadcast technology, a broadcast company may transmit the same nationwide broadcast contents or regionally different broadcast contents through one broadcast channel. Recently, the literature "Robust synchronization for the OFDM-based cloud transmission system", which has been published through IEEE International Symposium on Broadband Multimedia System and Broadcasting (BMSB), in June, 2013, suggested the frame structure of a frequency-shared terrestrial broadcast signal with the purpose of demodulation by distinguishing respective broadcast signals in a frequency-shared terrestrial broadcast system.

In the frequency-shared terrestrial broadcast, a receiver needs to be able to receive one or more frequency-shared broadcast signals in a region where signals transmitted from different transmitters overlap in a single frequency network, i.e., an overlapping region. That is, the receiver needs to be able to demodulate one or more frequency-shared terrestrial broadcast signals in a situation where the same channel interferences exist.

SUMMARY OF THE INVENTION

An object of the present invention is to provide a method and apparatus for transmitting a pilot signal for a frequency-shared broadcast.

Another object of the present invention is to provide a method and apparatus for transmitting a pilot signal for a frequency-shared terrestrial broadcast system which operates in a single frequency network.

Another object of the present invention is to arrange a pilot signal so that the receiver may distinctively receive one or more frequency-shared broadcast signals which are simultaneously transmitted in an overlapping region where signals transmitted from different transmitters overlap in a single frequency network.

In accordance with an aspect of the present invention, a method of transmitting, by a transmission device, broadcast signals in a frequency-shared terrestrial broadcast system includes generating the broadcast signals including pilot signals arranged at a physical layer frame based on a group identification (ID) defined according to a broadcast service, and transmitting the generated broadcast signals to a reception device, wherein the positions of the pilot signals arranged at the physical layer frame are different by group IDs.

In accordance with another aspect of the present invention, a method of receiving, by a reception device, broadcast signals in a frequency-shared terrestrial broadcast system includes receiving the broadcast signals from at least one reception device, detecting the pilot signals arranged in a physical layer frame of the broadcast signals based on a group ID defined according to a broadcast service, and demodulating the broadcast signals based on the pilot signals, wherein the positions of the pilot signals arranged at the physical layer frame are different by group IDs.

In accordance with yet another aspect of the present invention, an apparatus for transmitting broadcast signals in a frequency-shared terrestrial broadcast system includes a signal processing unit which generates broadcast signals including pilot signals arranged at a physical layer frame based on group IDs defined according to a broadcast service, and a transmission unit which transmits the generated broadcast signals to a receiver, wherein the signal processing unit arranges the pilot signals at different positions by group IDs in the physical layer frame.

BRIEF DESCRIPTION OF THE DRAWINGS

FIG. 3 shows arrangement examples of pilot signals according to the present invention;

DETAILED DESCRIPTION OF THE EMBODIMENTS

Figure 1:
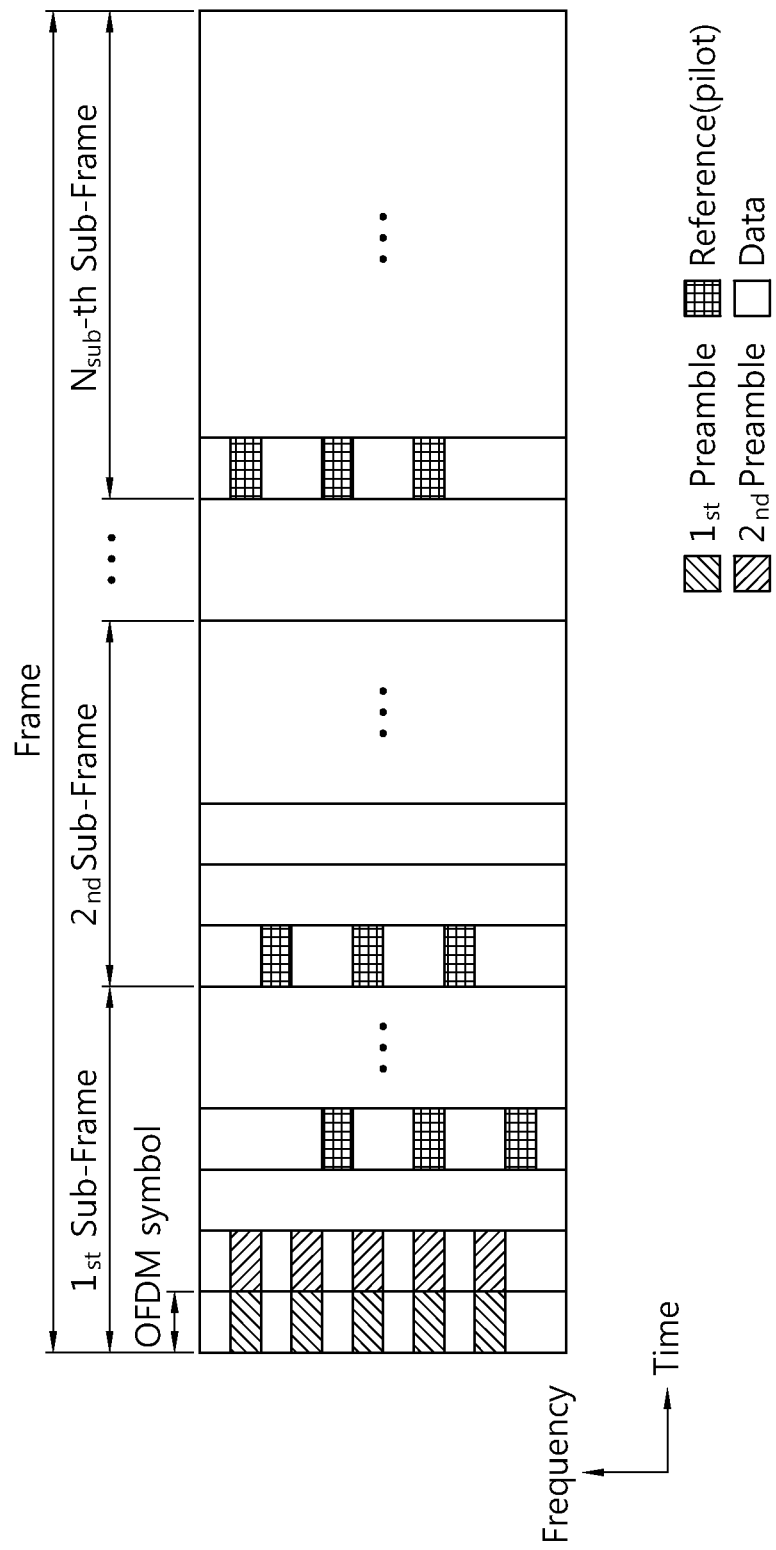
FIG. 1 shows an example of a frame structure of a frequency-shared terrestrial broadcast system to which the present invention is applied.

Hereinafter, embodiments of the present invention will be described in detail with reference to the accompanying drawings so that they can be readily implemented by those skilled in the art.

Hereinafter, some embodiments of the present invention are described in detail with reference to the accompanying drawings in order for a person having ordinary skill in the art to which the present invention pertains to be able to readily implement the invention. It is to be noted the present invention may be implemented in various ways and is not limited to the following embodiments. Furthermore, in the drawings, parts not related to the present invention are omitted in order to clarify the present invention and the same or similar reference numerals are used to denote the same or similar elements.

The objects and effects of the present invention can be naturally understood or become clear by the following description, and the objects and effects of the present invention are not restricted by the following description only.

The objects, characteristics, and merits will become more apparent from the following detailed description. Furthermore, in describing the present invention, a detailed description of a known art related to the present invention will be omitted if it is deemed to make the gist of the present invention unnecessarily vague. A preferred embodiment in accordance with the present invention is described in detail below with reference to the accompanying drawings.

A physical layer frame for a frequency-shared terrestrial broadcast system, to which the present invention is applied, includes one or more subframes in the time domain, and one subframe is composed of one or more data orthogonal frequency division multiplexing (OFDM) symbols. The frame includes one or more subcarriers in the frequency domain. The data OFDM symbol includes one or more data signals and one or more pilot signals. The pilot signal is used in estimating the channel for demodulating data in a receiver.

FIG. 1 shows an example of a frame structure of a frequency-shared terrestrial broadcast system to which the present invention is applied.

Referring to FIG. 1, one frame may be composed of Nsub subframes in the time domain, and one subframe may be composed of one or more OFDM symbols.

A first subframe may be composed of two preambles, one or more pilot signals, and a plurality of data signals. At this time, data signals may be transmitted instead of the pilot signals within the first subframe. That is, the first subframe may be composed of only two preambles and a plurality of data signals. The pilot signal may exist at a position which has been promised in advance.

Figure 2:
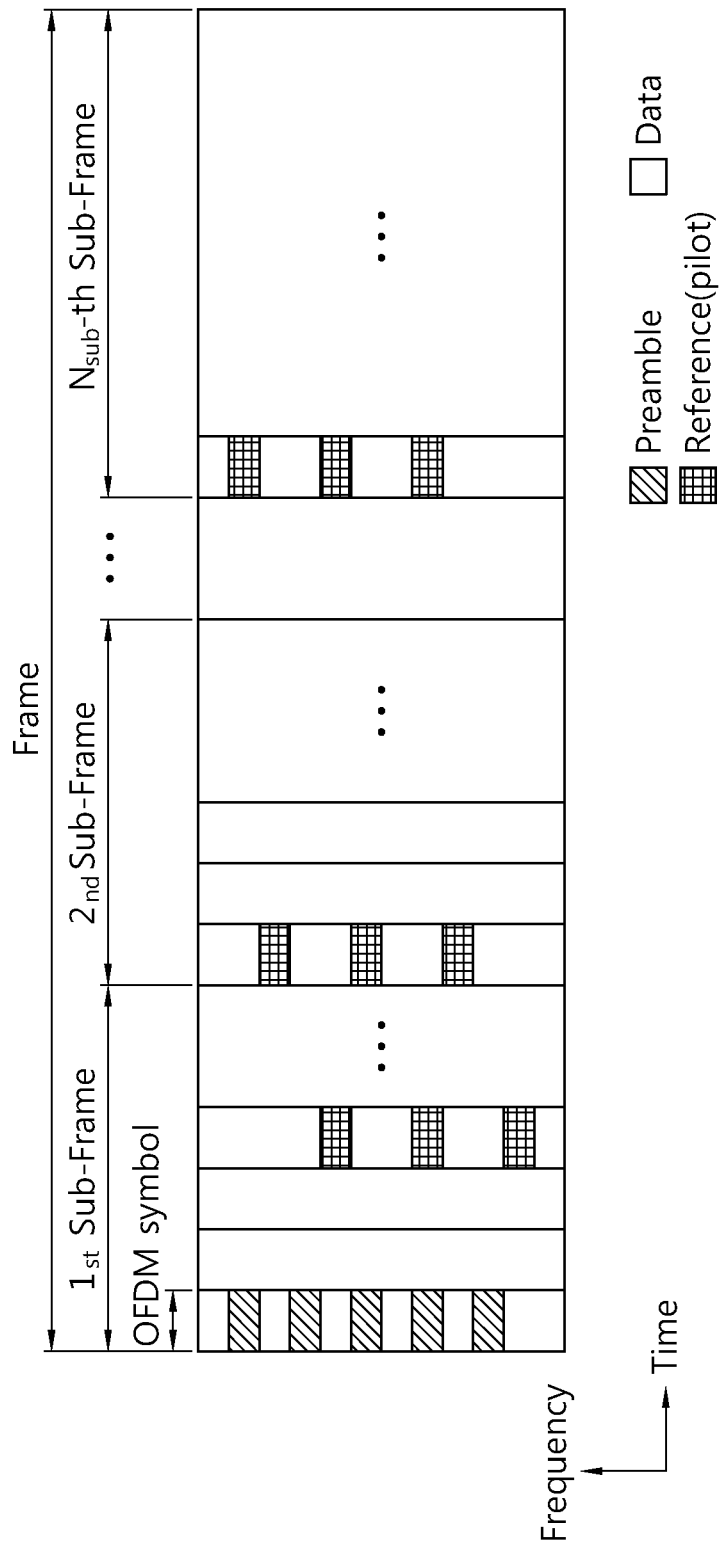
FIG. 2 shows another example of a frame structure of a frequency-shared terrestrial broadcast system to which the present invention is applied.

FIG. 2 shows another example of a frame structure of a frequency-shared terrestrial broadcast system to which the present invention is applied.

Referring to FIG. 2, one frame may be composed of Nsub subframes, and one subframe may be composed of one or more OFDM symbols.

A first subframe may be composed of one preamble, one or more pilot signals, and a plurality of data signals. At this time, data signals may be transmitted instead of pilot signals within the first subframe. That is, the first subframe may be composed of only one preamble and a plurality of data signals. The pilot signal may exist at a position which has been promised in advance.

However, FIGS. 1 and 2 are examples, and the present invention may be applied to a frequency-shared terrestrial broadcast system having a frame structure other than the frames described with reference to FIGS. 1 and 2.

FIG. 3 shows arrangement examples of pilot signals according to the present invention.

Referring to FIG. 3, pilot signals and data signals are allocated in the frequency and time domain for the frequency-shared terrestrial broadcast according to the present invention, and are then transmitted from the transmitter to the receiver. In this case, the pilot signals may be arranged in the frequency domain and/or the time domain at regular subcarrier intervals. Furthermore, the pilot signals may also be arranged at the subcarrier position and/or the time position.

The pilot signals may be arranged (or mapped) at different positions so as not to be overlapped in respective frequency-shared terrestrial broadcast signals which are transmitted from different transmitters. In other words, when a plurality of frequency-shared terrestrial broadcast signals are transmitted through one frequency, the plurality of frequency-shared broadcast signals may be divided into a certain number of groups. For example, the plurality of frequency-shared terrestrial broadcast signals may have different identifications (IDs) depending on whether the same broadcast service (or contents) is provided. In this case, non-overlapping pilot signal arrangement may be used depending on the group ID. That is, different pilot signal arrangements may be used in at least one of the frequency domain and the time domain of at least one subframe depending on the group ID. In other words, the pilot signal arrangement may be different in at least one of the OFDM symbol index at least one subframe and the subcarrier index, depending on the group ID.

In this case, the broadcast signal, which belongs to the same group ID, may be based on the same pilot signal arrangement, and the pilot signals may be arranged at different positions so that the pilot arrangement does not overlap between broadcast signals which belong to different group IDs. In this case, the transmitters, which belong to the same group ID, use the same pilot signal arrangement, and the transmitters, which belong to different group IDs, may use different pilot signal arrangement by dividing the group between a plurality of transmitters which use one frequency.

Specifically, for example, when there are three groups which provide three different broadcast services (or contents) through one frequency, group A 300, group B 310, and group C 320 may respectively transmit broadcast service A, broadcast service B, and broadcast service C through one frequency (or channel). In order for the receiver to restore desired broadcast signals in an overlapping region where two or more broadcast signals overlap, each group needs to use different pilot signal arrangements. In other words, the pilot signals of respective groups need to be arranged so as not to be overlapped on the frame. In contrast, the broadcast signals within the same group provides the same broadcast signal, and thus the pilot signal may be arranged at the same position on the frame.

In the above frequency-shared terrestrial broadcast system, the group is set based on the broadcast server (or contents) for adjacent transmitters which use the same frequency, and the transmitters, which belong to different groups, may transmit the broadcast signals which array pilot signals at different positions so that the pilot signals may not overlap, and the receiver may demodulate a desired broadcast service based on the pilot signals from simultaneously received broadcast signals.

Figure 4:
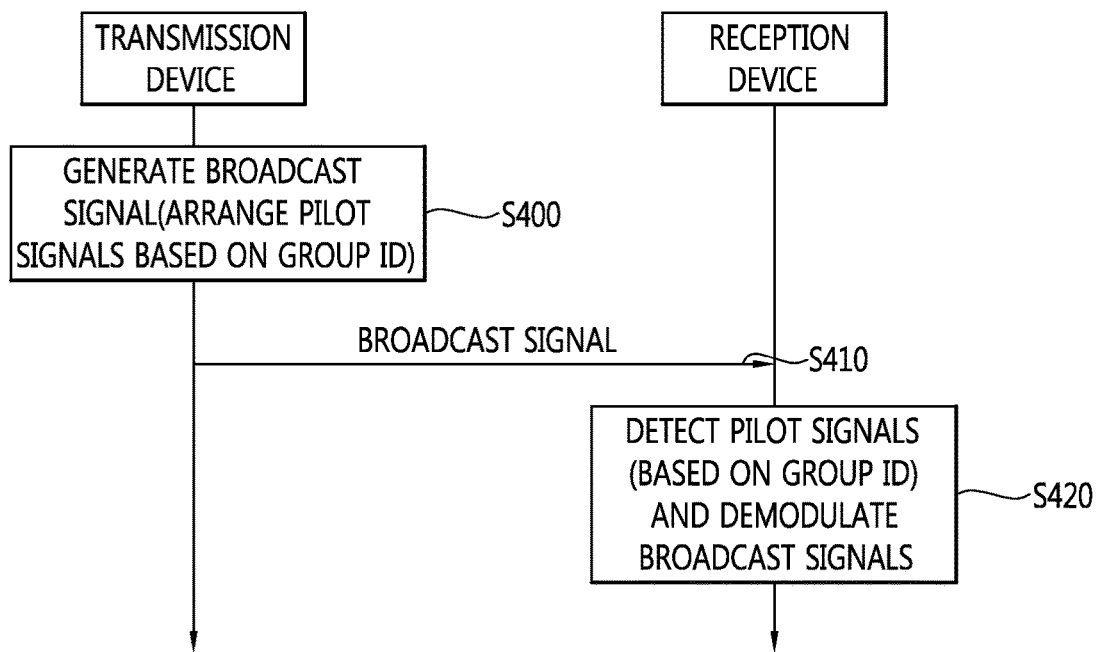
FIG. 4 is a flowchart illustrating an example of a method of transmitting and receiving a broadcast signal in a frequency-shared terrestrial broadcast system.

FIG. 4 is a flowchart illustrating an example of a method of transmitting and receiving a broadcast signal in a frequency-shared terrestrial broadcast system.

Referring to FIG. 4, a transmission device, which transmits frequency-shared terrestrial broadcast signals, generates broadcast signals (S400). In this case, the transmission device may arrange pilot signals in the physical layer frame based on the group ID which is defined according to the broadcast service (or contents). Here, the pilot signals may be arranged at different positions depending on the group ID. For example, the pilot signals may be arranged at different positions in at least one of the frequency domain and the time domain for each ID on at least one subframe. Furthermore, the pilot signals may be arranged at different positions in at least one of the OFDM symbol index or the subcarrier index for each group ID on at least one subframe.

The transmission device transmits the generated broadcast signal to the reception device (S410).

The reception device may detect the pilot signals from the received broadcast signals and demodulate the broadcast signals (S420). In this case, the reception unit may detect the pilot signals based on the group ID. The reception device may detect the pilot signals at different positions.

The reception device demodulates the broadcast signals based on the detected pilot signals.

According to the above-described embodiment of the present invention, in the frequency-shared terrestrial broadcast system, even when the broadcast signals are transmitted from different transmission devices in a single frequency network, the pilot signals of respective broadcast signals received at the reception device do not overlap, and thus the reception device may distinctively demodulate respective broadcast signals. Furthermore, even when a plurality of frequency-shared terrestrial broadcast signals are simultaneously received, the demodulation of individual broadcast signals is possible.

Figure 5:
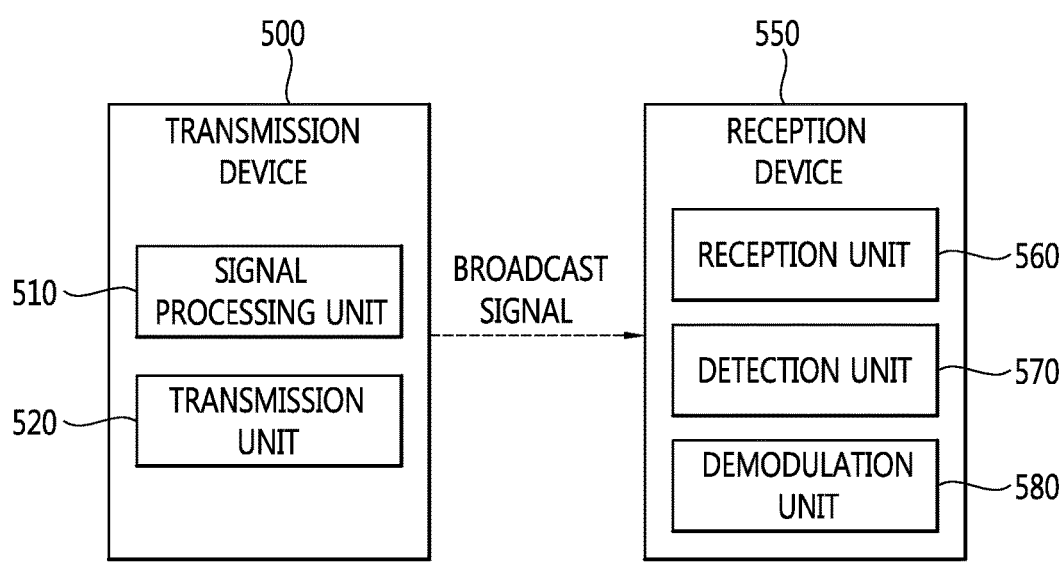
FIG. 5 is an example of a block diagram showing a transmission device and a reception device of a broadcast signal in a frequency-shared terrestrial broadcast system.

FIG. 5 is an example of a block diagram showing a transmission device and a reception device of a broadcast signal in a frequency-shared terrestrial broadcast system.

Referring to FIG. 5, the transmission device 500 includes a signal processing unit 510 and a transmission unit 520. The signal processing unit 510 performs necessary function and control so that the above-described features of the present invention may be implemented.

The signal processing unit 510 generates broadcast signals. In this case, the signal processing unit 510 may arrange pilot signals at the physical layer frame based on the group ID when generating the broadcast signals. The group ID may be defined according to the broadcast service (or contents).

The signal processing unit 510 may differently arrange the positions of the pilot signals by group IDs when arranging the pilot signals at the physical layer frame. For example, the signal processing unit 510 may set the pilot signals to be placed at different positions in at least one of the frequency domain and the time domain by group IDs on at least one subframe. Furthermore, the signal processing unit 510 may set the pilot signals to be placed at different positions in at least one of the OFDM symbol index and the subcarrier index by group IDs on at least one subframe.

The transmission unit 520 transmits the generated broadcast signals to the reception device 550.

The reception device 550 includes a reception unit 560, a detection unit 570, and a demodulation unit 580.

The reception unit 560 receives broadcast signals transmitted by at least one transmission device 500.

The diction unit 570 detects the pilot signals from the broadcast signal. In this case, the detection unit 570 may detect the pilot signals arranged at the physical layer frame of the broadcast signals based on the group ID. The detection unit 570 may detect the pilot signals at different positions by group IDs.

The demodulation unit 570 demodulates the broadcast signals based on the detected pilot signals.

According to the present invention, in a frequency-shared terrestrial broadcast system, even when a broadcast signal is transmitted from different transmitters in a single frequency network, a pilot signal of each broadcast signal received from the receiver does not overlap, and thus the receiver may distinctively demodulate each broadcast signal.

Furthermore, according to the present invention, even in a situation when a plurality of frequency-shared terrestrial broadcast signals are received, individual broadcast signals may be demodulated.

A person having ordinary skill in the art to which the present invention pertains may change and modify the present invention in various ways without departing from the technical spirit of the present invention. Accordingly, the present invention is not limited to the above-described embodiments and the accompanying drawings.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A method of transmitting, by a transmission device, broadcast signals in a frequency-shared terrestrial broadcast system, the method comprising:
    generating the broadcast signals including pilot signals arranged at a physical layer frame based on a group identification (ID) defined according to a broadcast service content; and
    transmitting the generated broadcast signals to a reception device,
    wherein the positions of the pilot signals arranged at the physical layer frame are different by group IDs,
    wherein the physical layer frame comprises a plurality of subframes in a time domain, and one subframe comprises a plurality of orthogonal frequency division multiplexing (OFDM) symbols,
    wherein one frame comprises a plurality of subcarriers in the frequency domain,
        wherein the positions of the pilot signals arranged in at least one of the plurality of subframes are different in at least one of the frequency domain and the time domain by group IDs,
        wherein the pilot signals of respective groups are arranged not to be overlapped on the frame, and
        wherein the broadcast signals within the same group provide the same broadcast service content so that the pilot signals are arranged at the same position on the frame.

2. The method of claim 1, wherein the positions of the pilot signals arranged in at least one of the plurality of subframes are different in at least one of the OFDM symbol index and the subcarrier index.

3. A method of receiving, by a reception device, broadcast signals in a frequency-shared terrestrial broadcast system, the method comprising:
    receiving the broadcast signals from at least one reception device;
    detecting the pilot signals arranged in a physical layer frame of the broadcast signals based on a group identification (ID) defined according to a broadcast service content; and
    demodulating the broadcast signals based on the pilot signals,
    wherein the positions of the pilot signals arranged at the physical layer frame are different by group IDs, wherein the physical layer frame comprises a plurality of subframes in a time domain, and one subframe comprises a plurality of orthogonal frequency division multiplexing (OFDM) symbols, wherein one frame comprises a plurality of subcarriers in the frequency domain, wherein the positions of the pilot signals arranged in at least one of the plurality of subframes are different in at least one of the frequency domain and the time domain by group IDs, wherein the pilot signals of respective groups are arranged not to be overlapped on the frame, and wherein the broadcast signals within the same group provide the same broadcast service content so that the pilot signals are arranged at the same position on the frame.

4. The method of claim 3, wherein the positions of the pilot signals arranged in at least one of the plurality of subframes are different in at least one of the orthogonal frequency division multiplexing (OFDM) symbol index and the subcarrier index.

5. An apparatus for transmitting broadcast signals in a frequency-shared terrestrial broadcast system, the apparatus comprising:

a signal processor that generates broadcast signals including pilot signals arranged at a physical layer frame based on group identifications (IDs) defined according to a broadcast service content; and a transmitter that transmits the generated broadcast signals to a receiver, wherein the signal processor arranges the pilot signals at different positions by group IDs in the physical layer frame, wherein the physical layer frame comprises a plurality of subframes in a time domain, and one subframe comprises a plurality of orthogonal frequency division multiplexing (OFDM) symbols, wherein one frame comprises a plurality of subcarriers in a frequency domain, wherein the signal processor sets the positions of the pilot signals arranged in at least one of the plurality of subframes to be different in at least one of the frequency domain and the time domain by group IDs, wherein the pilot signals of respective groups are arranged not to be overlapped on the frame, and wherein the broadcast signals within the same group provide the same broadcast service content so that the pilot signals are arranged at the same position on the frame.

6. The apparatus of claim 5, wherein the signal processor sets the positions of the pilot signals arranged in at least one of the plurality of subframes to be different in at least one of the OFDM symbol index and the subcarrier index.

* * * * *